US005583288A

United States Patent [19]

Brenner et al.

[11] Patent Number: 5,583,288
[45] Date of Patent: Dec. 10, 1996

[54] COMBINATION VEHICLE BRAKE LIGHT INSPECTION DEVICE AND TIRE BILLY

[76] Inventors: Daryl E. Brenner, 7062 E. Bath, Bancroft, Mich. 48414; Virgil J. Ates, 1573 W. Rolston Rd., Linden, Mich. 48451

[21] Appl. No.: 500,665

[22] Filed: Jul. 11, 1995

[51] Int. Cl.⁶ .................... G01L 5/28; A47F 5/00
[52] U.S. Cl. ........................ 73/132; 248/354.5
[58] Field of Search ................. 73/132; 403/104; 248/161, 162.1, 326, 333, 334, 335, 336, 337, 354.6, 354.5

[56] References Cited

U.S. PATENT DOCUMENTS

| | | | |
|---|---|---|---|
| 214,549 | 4/1879 | Bruen | 248/336 |
| 214,618 | 4/1879 | Bruen | 248/336 |
| 334,243 | 1/1886 | Lang et al. | 248/335 |
| 1,242,125 | 11/1916 | Bean | 248/333 |
| 1,681,192 | 8/1928 | McBride | 73/132 |
| 1,760,602 | 5/1930 | McKinney et al. | 73/132 |
| 1,775,828 | 9/1930 | Patton | 73/132 |
| 2,523,535 | 9/1950 | Little | 248/354.6 |
| 2,820,626 | 1/1958 | Hedeen | 248/354.5 |
| 2,937,842 | 5/1960 | Meek | 248/354.5 |
| 3,367,689 | 2/1968 | McCarthy | 248/354.6 |
| 3,516,200 | 6/1970 | Marin | 248/354.5 |
| 3,722,266 | 3/1973 | Dunham | 73/132 |
| 3,870,278 | 3/1975 | Lee | 254/98 |
| 3,981,189 | 9/1976 | Howard et al. | 73/155 |
| 4,050,107 | 9/1977 | Parma | 7/1 |
| 4,289,292 | 9/1981 | Kunjumon | 248/333 |
| 4,699,238 | 10/1987 | Tamir | 180/287 |
| 4,778,181 | 10/1988 | Arney | 273/84 |
| 4,781,375 | 11/1988 | Nye | 273/15 R |
| 5,011,174 | 4/1991 | Ross-Clunis | 280/287 |
| 5,020,752 | 6/1991 | Rizzi et al. | 248/162.1 |
| 5,213,388 | 5/1993 | Baker | 296/65.1 |
| 5,345,796 | 9/1994 | Chieh et al. | 70/202 |

FOREIGN PATENT DOCUMENTS

| | | | |
|---|---|---|---|
| 513642 | 4/1954 | France | 248/354.6 |
| 63084 | 7/1955 | France | 248/354.6 |
| 876190 | 5/1953 | Germany | 248/354.6 |

OTHER PUBLICATIONS

"Pedal Pusher" Sales Brochure, Chappaqua, NY.

Primary Examiner—Richard Chilcot
Assistant Examiner—Paul D. Amrozowicz
Attorney, Agent, or Firm—Gifford, Krass, Groh, Sprinkle, Patmore, Anderson & Citkowski, P.C.

[57] ABSTRACT

A combination brake light testing device and tire billy is provided for use with a vehicle, such as a school bus or any C.D.L. (Commercial Driver License) vehicle. The device includes an elongated tube having an elongated rod telescopically received within it so that the rod is movable between an extended and a retracted position. A compression spring is compressed between the rod and tube and resiliently urges the rod toward its extended position. The device is dimensioned so that, with one of the tube or the rod in abutment with the driver's seat and the other of the tube or the rod in abutment with the brake pedal, the brake pedal is actuated thereby allowing inspection of the brake lights. A handgrip portion is also provided around the tube adjacent one end while a tire impact member is secured at the opposite end of the tube so that the device can be used as a tire billy.

4 Claims, 1 Drawing Sheet

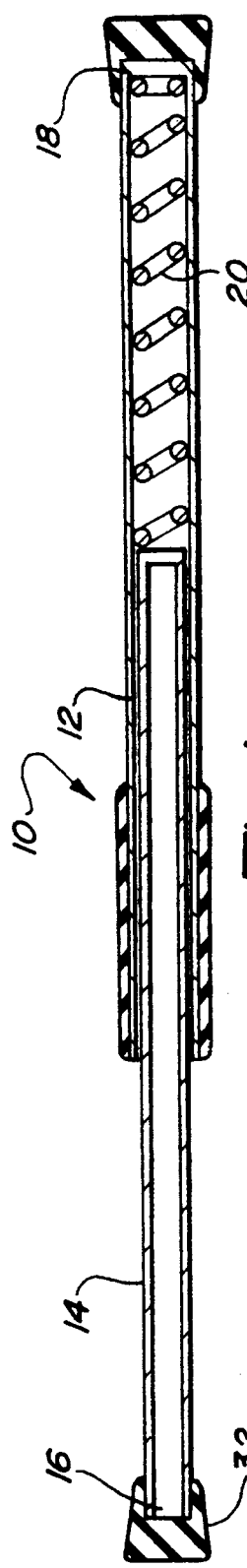
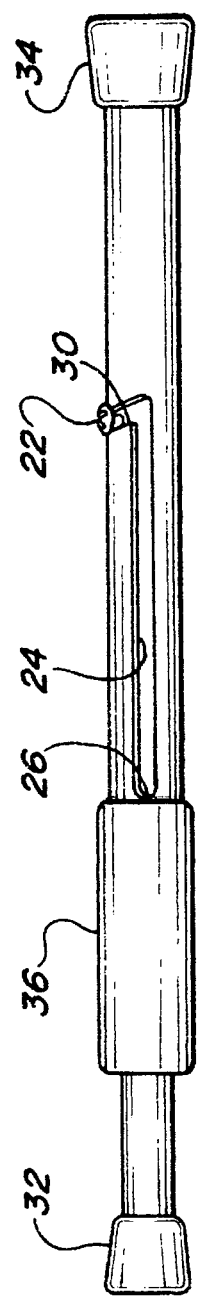
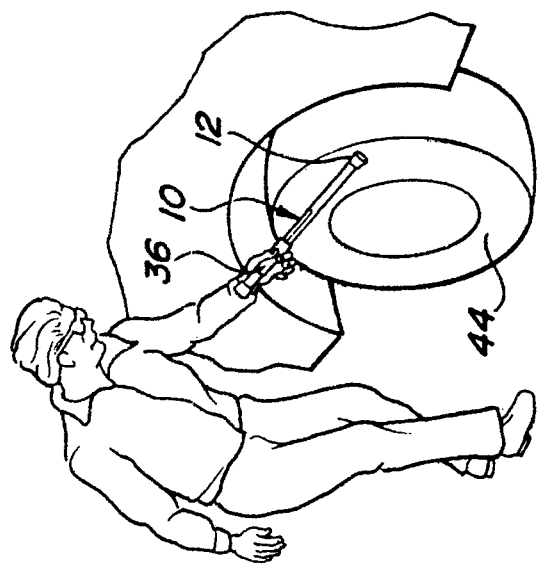
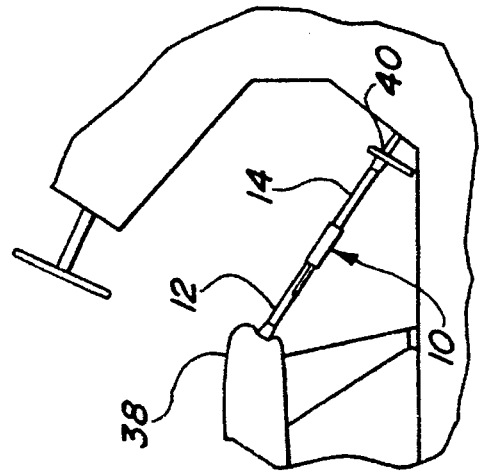
Fig-1
Fig-2
Fig-3
Fig-4

5,583,288

1

COMBINATION VEHICLE BRAKE LIGHT INSPECTION DEVICE AND TIRE BILLY

BACKGROUND OF THE INVENTION

1. Field of the Invention

The present invention relates generally to inspection devices for Commercial Driver License (C.D.L.) motor vehicles and, more particularly, to a combination brake light inspection device and tire billy.

2. Description of the Prior Art

Many C.D.L. laws applicable to commercial vehicles, such as school buses, require periodic inspection of the vehicle's brake lights as well as the tire inflation. Indeed, for school buses or any C.D.L. vehicle, the brake lights must be tested before each operation of the school bus or C.D.L. vehicle.

In order to test the actuation of the brake lights, it has been the previous practice to have an inspector stand behind the vehicle while the driver depresses the brake pedal. While this method is effective, it advantageously requires two persons to perform the brake light inspection.

Similarly, the tire inflation on all commercial and C.D.L. vehicles such as school buses is typically tested with a tire billy. The tire billy is elongated and has an impact member at one end which is struck against the tire to test its inflation. Previously, a tire billy would serve no other purpose other than the tire billy.

SUMMARY OF THE PRESENT INVENTION

The present invention provides a combination brake light testing device and tire billy which overcomes all the above mentioned disadvantages of the previously known devices.

BRIEF DESCRIPTION OF THE DRAWING

The device of the present invention comprises an elongated tube having a rod telescopically received within and movable between an extended and an extracted position. The rod is also perfectly tubular and a compression spring is entrapped between the rod and the tube which urges the rod toward its extended position.

In order to test the brake lights on the motor vehicle, the device is entrapped between the driver's seat and the brake pedal. In doing so, the spring is sufficiently strong to cause actuation of the brake lights which can then be viewed by the vehicle driver.

The inspection device also includes a bayonet lock which enables the tube and rod to be locked together in their retracted position. A handgrip portion is provided around the tube adjacent one end while a tire impact member is secured to the opposite end of the tube. With the device in this configuration, it is used as a tire billy to test for inflation of the vehicle tires.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a longitudinal sectional view illustrating a preferred embodiment of the present invention;

FIG. 2 is an elevational view illustrating the preferred embodiment locked in its retracted position;

2

FIG. 3 is a side view wheel illustrating the operation of the present invention for actuating the brake pedal; and FIG. 4 is a view similar to FIG. 3 but illustrating the operation of a device of the present invention as a tire billy.

DETAILED DESCRIPTION OF A PREFERRED EMBODIMENT OF THE PRESENT INVENTION

With reference first to FIG. 1, an elevational view of the combination safety device and tire billy 10 of the present invention is there shown and comprises an elongated tube 12 closed at one end 18 having a rod 14 telescopically slidably received in the tube 12. The rod 14 is movable between an extended position, illustrated in FIG. 1, and a retracted position illustrated in FIG. 2.

Referring now to FIGS. 1 and 2, the rod 14 is either cylindrical or tubular in shape and is closed at one end 16. A compression spring 20 is then entrapped between the rod 14 and tube 12. This compression spring 20 urges the rod 14 towards its extended position.

Both the tube 12 and rod 14 are preferably circular in cross-sectional shape. Additionally, a pin 22 is secured to and extends radially outwardly from the rod 14. The pin 22, in turn, is slidably received within a longitudinal slot 24 formed part way along the tube 12. This slot 24 is closed at one end 26 thereby preventing the rod 14 and tube 12 from separating from each other.

As best shown in FIG. 2, a locking slot 30 extends circumferentially partway around the tube 12 adjacent its end 13. The slot 30 is dimensioned to slidably receive the pin 22. Thus, in order to lock the tube 12 and rod 14 together in their retracted position, the rod 14 is first slid until the pin 22 registers with the slot 20. Rotation of the rod 14 with its attached pin 22 into the slot 30 thus locks the device 10 in its retracted position. Additionally the slot 30 is preferably slightly angled away from the end 18 of the tube 12 for secure locking of the tube 12 and rod 14 together.

A cap 32, preferably constructed of a resilient material, is provided across the end 16 of the rod 14. Similarly, a second cap 34, preferably constructed of a resilient material, is provided around the end 18 of the tube 12. Additionally, a tubular and cylindrical handgrip 36 is provided around the tube 12 adjacent the end of the tube 12 opposite from its end 18. The handgrip 36 is also constructed of a resilient material.

With reference now to FIG. 3, the operation of the device 10 and the present invention for actuating the brake lights of a motor vehicle is there illustrated. In order to operate the device, the tube 12 and rod 18 are rotated relative to each other until the pin 22 registers with the slot 24. In doing so, the spring 20 urges the rod 14 into tube 12 away from each other.

With one end of either the rod 14 or tube 12 positioned against the driver's seat 38 and the other end of the rod 14 or tube 12 positioned against the brake pedal 40, the compression spring 20 is sufficiently strong to actuate the brake pedal. This allows the driver to then inspect the rear of the vehicle to determine if the brake lights are in fact illuminated. Once the inspection is completed, the rod 14 and tube 12 are again locked together in their retracted position and stored in any conventional fashion.

With the rod 14 and tube 12 locked in their retracted position as illustrated in FIG. 4, the device tank can be used as a tire billy for testing the inflation of a tire 44. In using the device 10 as a tire billy, the device 10 is gripped by the user around the handgrip 36 and the tube 12 is struck against the tire 44 to test inflation in the conventional fashion.

Having thus described our invention, it can be seen that the present invention provided a unique combination brake light testing device and tire billy. Having described our invention, however, many modifications thereto will become apparent to those skilled in the art which pertains about deviation from the spirit of the invention as defined by the scope of the appended claims.

We claim:

1. A combination brake light testing device and tire billy for a vehicle having a driver's seat and a brake pedal which, upon actuation, illuminates the brake lights on the vehicle, said combination brake light testing device and tire billy comprising:

an elongated tube having an open end and a closed end, an elongated rod, said rod being telescopically received through said open end of said tube so that a first end of said rod is positioned within said tube and a second end is positioned outside of said tube, said rod being movable between an extended position and a retracted position, means for selectively locking said rod in said retracted position, a compression spring for resiliently urging said rod towards said extended position, said spring having one end in abutment with said closed end of said tube and a second end of said spring being in abutment with said first end of said rod, said spring being dimensioned so as to be in a state of compression in both said extended and said retracted position of said rod, wherein said tube and said rod are dimensioned so that, with one of the tube or the rod in abutment with the driver's seat and the other of the tube or the rod in abutment with the brake pedal, said spring means causes actuation of the brake pedal to thereby enable inspection of the vehicular brake lights, and a handgrip portion secured around said tube adjacent one end, wherein with said rod locked in said retracted position, said device forms a tire billy, wherein said locking means comprises:

a longitudinally extending slot formed in said tube, said slot having a first end spaced inward from said closed end of said tube and a second end spaced inwardly from said end of said tube, and a length equal to the distance between said ends of said slot, an outwardly extending pin secured to said rod and slidably mounted in said slot, a locking slot which extends circumferentially from said longitudinal slot part way around said tube at said first end of said slot, said locking slot dimensioned to slidably receive pin and said locking slot intersecting said longitudinal at an acute angle so that said locking slot angles away from said closed end of said tube, and wherein said pin limits movement of said rod relative to said tube to the length of said slot.

2. The invention as defined in claim 1 wherein said rod is tubular in construction.

3. The invention as defined in claim 1 wherein said handgrip portion is tubular and cylindrical in shape.

4. The invention as defined in claim 4 wherein said handgrip portion is constructed of a resilient material.

* * * * *